United States Patent [19]
Lai et al.

[11] Patent Number: 5,329,398
[45] Date of Patent: Jul. 12, 1994

[54] SINGLE GRATING LASER PULSE STRETCHER AND COMPRESSOR

[75] Inventors: Ming Lai, Mission Viejo; Shui T. Lai, Encinitas, both of Calif.

[73] Assignee: Novatec Laser Systems, Inc., Carlsbad, Calif.

[21] Appl. No.: 972,169

[22] Filed: Nov. 5, 1992

[51] Int. Cl.[5] .......................... G02B 27/44; G02B 5/04; H01S 3/10
[52] U.S. Cl. ........................... 359/566; 359/615; 372/25
[58] Field of Search ............... 359/347, 348, 349, 130, 359/566, 572, 615, 558; 372/23, 25, 102

[56] References Cited

U.S. PATENT DOCUMENTS

| | | | |
|---|---|---|---|
| 4,655,547 | 4/1987 | Heritage et al. | 359/566 |
| 4,746,193 | 5/1988 | Heritage et al. | 359/566 |
| 4,750,809 | 6/1988 | Kafka et al. | 359/566 |
| 4,834,474 | 5/1989 | George et al. | 359/8 |
| 4,928,316 | 5/1990 | Heritage et al. | 359/154 |
| 5,077,621 | 12/1991 | Kühnle et al. | 359/572 |
| 5,166,818 | 11/1992 | Chase et al. | 359/615 |

*Primary Examiner*—Loha Ben
*Assistant Examiner*—John Juba, Jr.
*Attorney, Agent, or Firm*—Frank D. Gilliam

[57] ABSTRACT

A single-grating method and apparatus is described for a laser pulse stretcher and compressor. The method and apparatus exploits a two-layer vertical structure. One layer for the stretcher, and the other, for the compressor. Such a stretch-compressor is particularly suitable for using in a chirped-pulse or regenerative laser amplifier where laser wavelength tuning is desirable. When a change in the wavelength is applied, only one rotational adjustment is required to resume the alignment of the whole stretcher and compressor. This apparatus shows significant simplification in structure and alignment over the existing stretcher and compressor systems.

16 Claims, 1 Drawing Sheet

SINGLE GRATING LASER PULSE STRETCHER AND COMPRESSOR

BACKGROUND OF THE INVENTION

This invention relates to temporally stretch and compress laser pulses and particularly for the application of amplifying sub-picosecond laser pulses (less than 1 ps) to an energy level greater than 100 micro joules (J) per pulse.

An optical pulse stretcher-compressor is a key element in a chirped-pulse or regenerative laser amplifier for amplifying sub-picosecond laser pulses to an energy level greater than 100 micro joule per pulse. In this application, the stretcher is used to lengthen the optical pulses before the amplification, and the compressor is used to resume the original pulse duration after the amplification. In this way, the peak power inside the amplifier cavity can be kept low enough to avoid any damage to the optical elements and avoid nonlinear distortion on the pulse shape and beam profile.

Using a pair of diffraction gratings to compress optical pulses was proposed by Treacy 1 in 1969 and then by Martinez 2 in 1987. Grating-based optical pulse stretcher and compressor were first investigated experimentally by Pessot, Me., and Mourou 3 in 1987.

In the early design of Pessot etc. 3, four identical diffraction gratings were used. Two of the gratings were used in the stretcher to lengthen an ultrashort laser pulse by introducing a positive group velocity dispersion to the pulse. The other two gratings were used in the compressor to compensate precisely the phase modulation in the stretched pulse by introducing a negative group velocity dispersion.

Recent advances in self mode-locked Titanium:sapphire lasers and regenerative Titanium:sapphire amplifiers have led to a rapid development of laser pulse stretcher-compressors. Modified designs of the Pessot's stretcher-compressor 3 are commercially available and have four gratings 4, three gratings 5,6 or two gratings 7. Although the basic mechanism of phase modulation remains the same, these new designs greatly simplify the structure of the instrument and reduce the difficulty in alignment.

However, a major problem remains in all of those multiple-grating stretcher-compressors, namely, all of the gratings require precise readjustment when a change in the laser wavelength is required. These adjustments are extremely inconvenient when frequent changes in laser wavelength is required. Besides, strictly matched grating pairs are required in the stretcher and compressor in order to obtain required good beam profiles and appropriate pulse duration.

There is a continuing need for improvements in apparatus and methods for laser pulse stretcher-compressors.

References

1. E. B. Treacy, Optical pulse compression with diffraction gratings, IEEE Journal of Quantum Electronics, QE-5 (9),454 (1969).
2. O. E. Martinez, 3000 times grating compressor with positive group velocity dispersion: application to fiber compensation in 1.3–1.6 micro m region, IEFE Journal of Quantum Electronics, QE-23 (1), 454 (1987).
3. M. Pessot, P. Maine and G. Mourou, 1000 times expansion/compression of optical pulses for chirped pulse amplification, Optics Communications, 62 (6), 419 (1987).
4. Quantronix product catalog, Model 4800 Tsunami Amplifier, Quantronix, 49 Wireless Blvd., P.O. Box 9014, Smithtown, N.Y. 11787.
5. Spectra-Physics product catalog, 0.1 TW Ti:sapphire Amplifier System, Spectra-Physics Lasers, 1330 Terra Bella Ave., P.O. Box 7013, Mountain View, Calif. 94039.
6. Continuum product catalog, Ti:sapphire Terawatt Laser, Continuum, 408727-3240.
7. Quantronix product catalog, Model 4820 Stretcher/Compressor, Quantronix, 49 Wireless Blvd., P.O. Box 9014, Smithtown, N.Y. 11787.

SUMMARY OF THE INVENTION

The invention is directed to a new and novel method for combined pulse stretching and compression of a pulsed laser beam of various different output frequencies. The device utilizes a single grating device for both stretching and compressing of a laser pulse. The grating device has vertical height sufficient for six different level beam passes, namely, four passes for the stretcher and two passes for the compressor.

For the stretcher, the beam enters and strikes the grating and is directed through collimating optics, as for example, focusing lens, converging mirror or equivalent, to a mirror, the beam from the mirror is directed back to the grating element, the beam returns through the optics again striking a retro-reflective device such as for example, a roof mirror or the equivalent, the beam is again reflected to the grating, reflected from the grating to a mirror through collimating optics, reflected back to the grating, and exits the stretcher and enters a pulse amplifier.

When amplified, the beam enters a compressor in which utilizes the bottom portion of the grating element of the stretcher. The amplified beam enters the compressor and is directed toward the grating element, to a retro-reflective device, back to the grating element, to a mirror reflector, back to the grating, back to the retro-reflector device, as described above, from the retro-reflector to the grating and out for intended use now amplified and in substantially in its original pulse width.

When the frequency of the laser is changed the only element that needs adjusting is the diffraction grating. Preferably the grating element is adjusted only.

An object of this invention is to produce a laser pulse stretcher-compressor that requires only the adjustment of one grating when the pulse frequency is changed.

Another object of this invention is to provide a combined laser pulse stretcher and compressor utilizing a common grating element.

These and other objects and advantages of the present invention will become apparent to those skilled in the art after considering the following detailed specification in which the preferred embodiment is described in conjunction with the accompanying drawing Figures.

BRIEF DESCRIPTION OF THE DRAWING FIGURES

DETAILED DESCRIPTION OF THE DRAWING FIGURES

Figure 1:
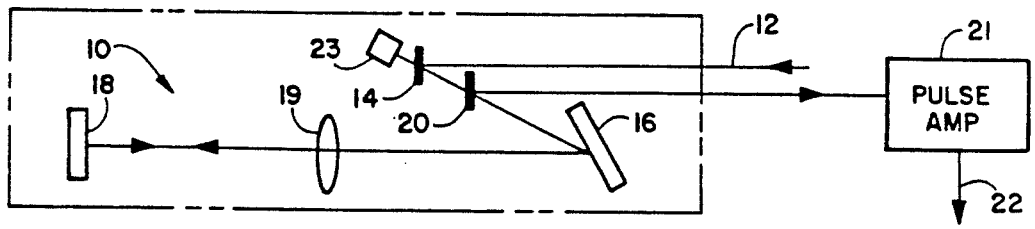
FIG. 1 depicts a schematic showing of the prior art pulse stretcher.
Figure 2:
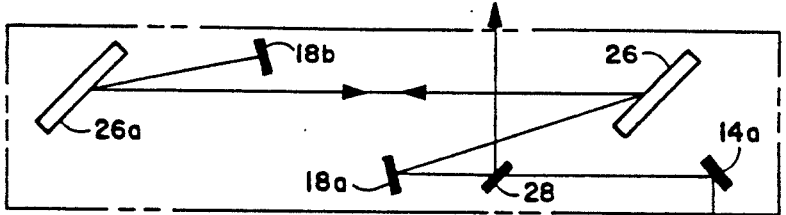
FIG. 2 depicts a schematic showing of a prior art grating pulse compressor.

Referring now to the various drawing Figures and particularly to prior art drawing FIGS. 1 and 2. In drawing FIG. 1 a grating pulse stretcher 10 is depicted. A pulsed laser beam 12 is introduced into the stretcher and impacts input mirror 14 which reflects the beam to grating 16. The beam is directed from the grating to a second mirror 18 through a collimating lens 19, reflected back to the grating through lens 19 and from the grating to a step down prism 23, the beam is reflected from the step down prism back to the grating, reflected from the grating through lens 19 to the second mirror 18, reflected from the second mirror through collimating lens 19, focusing element, to the grating, from the grating the beam is directed to output mirror 20 as a stretched beam which is directed to a pulses amplifier 21 well known in this art. Referring now to prior art drawing FIG. 2, after amplification the amplified-stretched beam 22 is directed into a compressor so that the original pulse duration can be re-established. The beam 22 is directed to an input mirror 14a to a mirror 18a to a grating 26, to a second grating 26a, to a step down retro-reflector 18b reflected back to grating 26a, reflected back to grating 26, reflected to mirror 18a, reflected to mirror 28 and reflected out for the amplified beam's intended use.

In the prior art showings the gratings 26 and 26a have to be repositioned with each beam frequency change. This requires precise parallel alignment of the two gratings 26 and 26a. This requires considerable operator skill for the re-positioning and is very time consuming. Many different frequency changes results in considerable down time repositioning the gratings.

Figure 3:
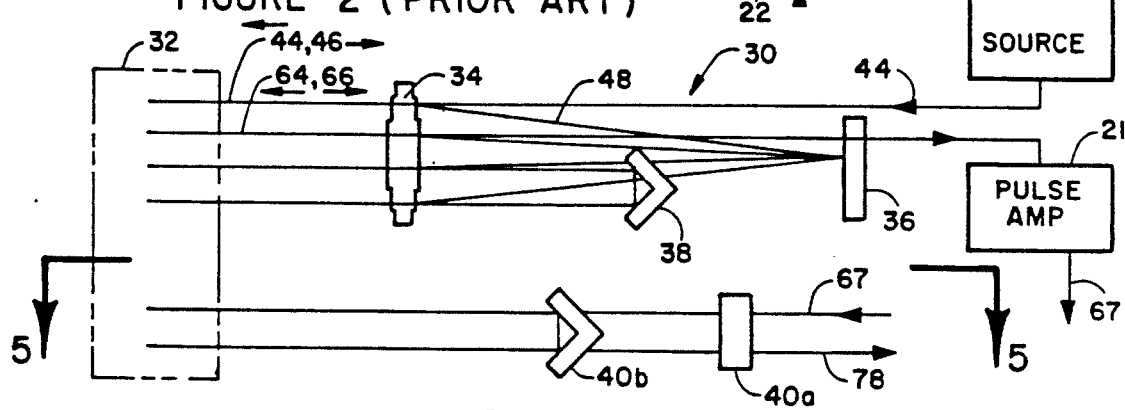
FIG. 3 depicts a schematic showing of a side view showing of the combined pulse stretcher-compressor of the invention showing beam vertical elevations.
Figure 4:
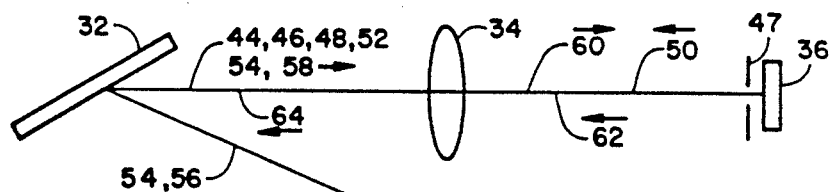
FIG. 4 depicts a plan view showing of FIG. 3 showing the beam path of the stretcher portion of the device.
Figure 5:
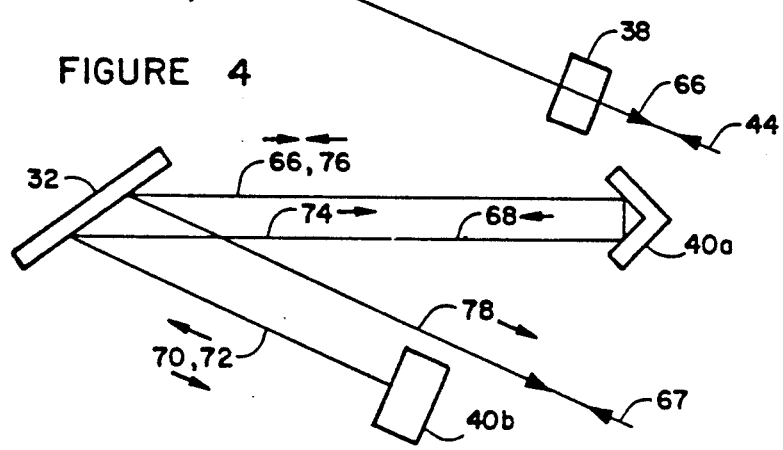
FIG. 5 depicts a plan view showing of the bottom portion of the FIG. 3 showing taken along line 5—5 of FIG. 3.

FIGS. 3-5 depict the stretcher-compressor 30 of the invention showing a single grating vertically stacked stretcher-compressor. FIG. 3 is a side view of the apparatus 30. The top portion (layer) is the laser pulse beam stretcher portion and the bottom portion (layer) is the laser pulse compressor portion. FIG. 4 is a top plan view of the stretcher, and FIG. 5 is a top plan view of the compressor taken along line 5—5 of FIG. 3.

As shown in drawing FIG. 4, the stretcher portion consists of the top half of a diffraction grating 32. Typically a 2"×4" rectangle with 1800 grooves per millimeter and gold coated, a focusing element such as for example, a lens 34 typically having a focal length of 50 cm, 1"×3.5" and an anti-reflection coating (AR), a flat mirror 36 having a dimension of 2"×2" a high reflection (HR) coating, and a retro-reflective device herein after referred to as a roof mirror reflector 38 typical a rectangular of 0.5"×3" HR coated for vertical displacement.

As shown in FIG. 5, the compressor portion composes the bottom half of the grating 32, a roof mirror reflector 40a typically a rectangle of 1"×3" HR coated) for horizontal displacement, and a roof mirror reflector 40b having typical dimensions of 0.5"×3" HR coated for vertical displacement.

As shown in FIGS. 3 and 4, a beam 44 of laser pulses to be stretched impinges on grating 32 in an angle near a Littrow angle. Its first order diffracted beam 46 hits lens 34. The transmitted beam 48 from the lens hits mirror 36. The reflected beam 50 from the mirror is directed to lens 34. Then the beam 52 from lens 34 is directed to grating 32. Lens 34 is vertically displaced down, as for example, ⅜" from the level of input beam 44. The returning beam 52 is lower than beam 44 as for example, ⅜" lower. The returning beam 52 is re-collimated by grating 32. The re-collimated beam 54 is directed from the grating to roof mirror reflector 38. The reflected beam 56 from the roof mirror reflector is spaced above beam 54 by approximately ¼" and is directed to grating 32. Then the diffracted beam 58 from the grating is directed to lens 34. The beam 60 leaving lens 34 is directed to mirror 36. The reflected beam 62 leaving mirror 36 passes through lens 34. The transmitted beam 64 leaving lens 34 is directed to grating 32. The beam leaving the grating is the stretched beam 66 is the output beam of the stretcher. That is, after impacting the grating 32 for the fourth time, the ultrashort pulses of input beam 44 become linearly chirped, stretched pulses of output beam 66. This output beam 66 propagates in the opposite direction of and with a displacement down input beam 44 as for example, ¼".

In another embodiment the pulse duration can be modified. The diffracted beam 46 after the grating element 32 is spatially spread out in the horizontal direction. The extent of this spread is defined by the spectral content of the laser pulse. An aperture 47 of a smaller dimension can be inserted in the beam path after beam position 46. The spatial content of the laser beam is reduced by such aperture size. The overall effect of reducing the beam spatial content is to increase the temporal profile of the laser pulse before such pulse is to be compressed in the pulse compressor of the instant invention.

As shown in drawing FIGS. 3 and 5, a beam 67 of laser pulses to be compressed impinges on grating 32 at the same angle as the input beam 44 of the stretcher. The first-order diffracted beam 66 from the grating hits a roof mirror reflector 40a. The reflected beam 68 from the reflector is side ways shifted as for example, about 1.5" from beam 66 and is directed to grating 32. This returning beam 68 is re-collimated by the grating. The re-collimated beam 70 impacts the retro-reflector 40b, typically a roof mirror reflector. The reflected beam 72 from the reflector is directed below the beam 70 as for example, by about a 1.5" and is directed toward grating 32. The diffracted beam 74 from the grating 32 is directed to roof mirror reflector 40a. The reflected beam 76 from the reflector 40a is sideways shifted from beam 74 as for example, about ¼" and is directed to grating 32. Then the diffracted beam 78 from the grating is the output of the compressor. Again, after hitting grating 32 for the fourth time, the linearly chirped, stretched pulses in input beam 67 become compressed, ultrashort pulses of output beam 78. This output beam 78 propagates in the opposite direction of and with a displacement down as for example, a ¼", from input beam 67.

In the stretcher, the spacing between lens 34 and mirror 36 should be equal to the focal length of the lens 34. The distance from grating 32 to lens 34 controls the amount of positive group velocity dispersion, which determines the ratio of pulse stretching. In the compressor, the path length from grating 32 to reflector 40a controls the amount of negative group velocity dispersion, which determines the ratio of pulse compression. The relevant theory can be found in references 2 and 3 above.

For the application of a regenerative or chirped-pulse amplifier, the output pulses from the stretcher are fed as seed pulses into the amplifier 21. The output pulses from the amplifier are then directed back as an input to the compressor. The output from the compressor is then of high energy up to 100 micro Joules, ultrashort less than 1 pico-second laser pulses.

The constituent elements making up this invention are well known in the pulsed laser beam art.

While specific embodiments of the combined laser pulse stretcher/compressor has been shown and fully explained above for the purpose of illustration it should be understood that many alterations, modifications and substitutions may be made to the instant invention disclosure without departing from the spirit and scope of the invention as defined by the appended claims.

What is claimed is:

1. A stretcher for a pulsed laser beam, said pulsed laser beam having a predetermined frequency, comprising:
   a single laser beam diffracting grating element, said grating element having a vertical and horizontal dimension;
   a focusing element;
   a reflector; and
   a retro-reflective element;
   means for directing said pulsed laser beam,
   wherein said pulsed laser beam is directed firstly to said grating element, secondly from said grating element back through said focusing element to said reflector, thirdly reflected back from said reflector through said focusing element to said grating element, fourthly diffracted from said grating element to said retro-reflective element where said beam is reflected along a substantially parallel path and fifthly said pulsed laser beam is re-directed to said grating element, and sixthly diffracted from said grating element through said focusing element onto said reflector and seventhly from said reflector through said focusing element to said grating element and eighthly from said grating element out of said pulsed laser beam stretcher for further processing, laser beam is horizontally offset from said fourthly directed pulsed laser beam and said fifthly directed pulsed laser beam is horizontally offset from said sixthly directed pulsed laser beam said firstly directed pulsed laser beam is vertically offset from said eighthly directed pulsed laser beam.

2. The invention as defined in claim 1 wherein the predetermined frequency of said pulsed laser beam can be changed to a second predetermined frequency and said stretcher can be adapted to said second predetermined frequency by repositioning only said grating element.

3. The invention as defined in claim 1 wherein said focusing element is a focusing lens.

4. The invention as defined in claim 1 wherein said retro-reflecting element is a roof mirror.

5. A compressor for a pulsed laser beam, said pulsed laser beam having a predetermined frequency comprising:
   a first retro-reflector;
   a diffracting grating element;
   a second retro-reflector; and
   a means for directing said laser beam;
   wherein said pulsed laser beam is firstly directed to said grating element and secondly diffracted from said grating element to said first retro-reflector, thirdly reflected from said first retro-reflector to said grating element, fourthly the pulsed laser beam is directed to said second retro-reflector where the beam elevation is changed, fifthly said pulsed laser beam is directed back to said grating element, sixthly directed to said first retro-reflector, seventhly reflected back to said grating element and eightly out of said compressor, said secondly directed pulsed laser beam is horizontally offset from said thirdly directed pulsed laser beam and said firstly directed pulsed laser beam is off set vertically from said eighthly directed pulsed laser beam.

6. The invention as defined in claim 5 wherein the predetermined frequency of said pulsed laser beam can be changed to a second predetermined frequency and said compressor can be adapted to said second predetermined frequency by repositioning only said grating element.

7. The invention as defined in claim 5 wherein said retro-reflecting elements are roof mirror.

8. A combined stretcher and compressor for a pulsed laser beam, said pulsed laser beam having a predetermined frequency, comprising:
   a single laser beam diffracting grating element, said single grating element having a vertical and horizontal dimension;
   a focusing element;
   a first reflector;
   a first retro-reflector;
   a second retro-reflector;
   a third retro-reflector;
   a pulsed laser amplifying means for amplifying said pulsed laser beam, having an input and an output; and
   a means for directing said laser beam;
   wherein said pulsed laser beam is directed firstly to said grating element, secondly from said grating element through said focusing element to said first reflector, thirdly reflected back from said first reflector through said focusing element to said grating element, fourthly diffracted from said grating element and directed to said first retro-reflector where said beam is reflected along a substantially parallel path and fifthly said pulsed laser beam is re-directed back to said grating element, and sixthly diffracted from said grating element through said focusing element onto said first reflector and seventhly from said first reflector through said focusing element to said grating element and eightly from said grating element out of said pulsed laser beam stretcher for further processing, and said firstly directed pulsed laser beam is vertically offset from said eighthly directed pulsed laser beam and the output beam from said stretcher is directed to the input of said pulsed laser amplifying means, the amplified output from said pulsed laser amplifying means is firstly directed to said grating element and secondly diffracted from said grating element to said second retro-reflector, thirdly directly from said second retro-reflector to said grating element, fourthly said pulsed laser beam directed to said third retro-reflector where its beam elevation is changed, fifthly said pulsed laser beam is directed back to said grating means, sixthly directed to said second retro-reflector, seventhly reflected back to said grating element and eighthly directed out of said compressor, said secondly directed pulsed laser beam from said amplifier is horizontally off set from said thirdly directed pulsed laser beam from said laser amplifier and said firstly directed pulsed laser beam from said amplifier is off set vertically from said eighthly directed pulsed laser beam exiting from the output of said compressor.

9. The invention as defined in claim 8 wherein the predetermined frequency of said pulsed laser beam can be changed to a second predetermined frequency and said stretcher and compressor can be adapted to said second predetermined frequency by repositioning only said grating element.

10. The invention as defined in claim 8 wherein said focusing element is a focusing lens.

11. The invention as defined in claim 8 wherein at least said first and second retro-reflecting elements are roof mirrors.

12. The invention as defined in claim 8 wherein the predetermined spectral frequency of said pulsed laser beam can be changed to a second predetermined spectral frequency and said stretcher and compressor can be adapted to said second predetermined frequency by repositioning said grating element.

13. A combined laser pulse stretcher and compressor device comprising:
 a laser source generating a pulsed laser beam with predetermined spectral content and predetermined temporal pulse width;
 a single optical diffraction grating element;
 a laser pulse stretcher means for temporally stretching pulses of said pulsed laser beam; and
 a laser pulse compressor means for temporally compressing pulses of said pulsed laser beam,
 such that said single optical diffraction grating element is used in both the laser pulse stretcher means and the laser pulse compressor means to control the temporal stretching and compressing of the pulses of said pulsed laser beam;
 wherein a predetermined spectral frequency of said pulsed laser beam can be changed to a second predetermined spectral frequency and said laser pulse stretcher means and said laser pulse compressor means can be adapted to said second predetermined spectral frequency by repositioning said single optical diffraction grating element.

14. The invention as defined in claim 13 wherein said laser pulse stretcher means, comprises:
 means for directing said pulsed laser beam;
 a grating element, said grating element having a vertical and horizontal dimension;
 a focusing element;
 a mirror reflector;
 a roof mirror retro-reflective element;
 said pulsed laser beam is directed firstly to said grating element, secondly diffracted from said grating element through said focusing element to said reflector, thirdly reflected back from said reflector through said focusing element to said grating element, fourthly diffracted from said grating element to said retro-reflective element where said beam is reflected along a substantially parallel path, and fifthly said pulsed laser beam is re-directed to said grating element, and sixthly diffracted from said grating element through said focusing element onto said reflector, seventhly reflected from said reflector through said focusing element back to said grating element, and eighthly diffracted from said grating element out of said laser pulse stretcher for further processing.

15. The invention as defined in claim 13 wherein said laser pulse compressor means comprises:
 means for directing said laser source;
 a grating element, said grating element having a vertical and horizontal dimension;
 a first roof mirror retro-reflector;
 a second roof mirror retro-reflector;
 said pulsed laser beam is firstly directed to said grating element and secondly diffracted from said grating element to said first retro-reflector, thirdly reflected from said first retro-reflector to said grating element, fourthly the pulsed laser beam is diffracted to said second retro-reflector where the beam elevation is changed, fifthly said pulsed laser beam is directed back to said grating means, sixthly directed to said first retro-reflector, seventhly reflected back to said grating element and eighthly diffracted out of said compressor, said secondly directed pulsed laser beam is horizontally offset from said thirdly directed pulsed laser beam, and said fifthly directed pulsed laser beam is offset vertically from said fourthly directed pulsed laser beam.

16. The invention as defined in claim 13 wherein said grating element comprises at least two sections.

* * * * *